United States Patent
Goldman et al.

(10) Patent No.: US 6,493,442 B1
(45) Date of Patent: Dec. 10, 2002

(54) AIN TRIGGERS TO INVOKE NON-AIN FEATURES

(75) Inventors: Stuart O. Goldman, Scottsdale, AZ (US); David J. Zwick, Glendale, AZ (US)

(73) Assignee: AG Communication Systems Corporation, Phoenix, AZ (US)

( * ) Notice: Subject to any disclaimer, the term of this patent is extended or adjusted under 35 U.S.C. 154(b) by 148 days.

(21) Appl. No.: 09/589,528

(22) Filed: Jun. 7, 2000

(51) Int. Cl.[7] .......................... H04M 3/42; H04M 7/00; H04L 12/16; G06F 17/30
(52) U.S. Cl. ........................ 379/207.02; 379/220.01; 370/261; 707/10
(58) Field of Search .................... 379/207, 220, 379/220.01, 207.02; 370/261; 707/10

(56) References Cited

U.S. PATENT DOCUMENTS

| | | | | |
|---|---|---|---|---|
| 5,892,821 A | * | 4/1999 | Turner | 379/220.01 |
| 5,949,763 A | * | 9/1999 | Lund | 370/261 |
| 6,185,565 B1 | * | 2/2001 | Meubus et al. | 707/10 |

* cited by examiner

*Primary Examiner*—Ahmad F. Matar
*Assistant Examiner*—Thjuan P Knowlin
(74) *Attorney, Agent, or Firm*—David J. Zwick

(57) ABSTRACT

An addition to AIN that allows SSP triggers to jump to internal SSP addresses for feature processing without a return. There is no query sent to an SCP nor the associated response message, call processing is not suspended, and there is no need for fault handling associated with the trigger.

6 Claims, 2 Drawing Sheets

AIN TRIGGERS TO INVOKE NON-AIN FEATURES

FIELD OF THE INVENTION

The present invention relates to the field of intelligent telephony networks, and more particularly to the use of Advanced Intelligent Network triggers to transfer control to switch-based call processing.

BACKGROUND OF THE INVENTION

Advanced Intelligent Network (AIN) is a telephone network architecture that allows network elements to instantaneously affect the routing or processing of calls based on criteria other than that of simply finding a connection path through the network. Network intelligence is decentralized off of the switch and distributed among intelligent network platforms, referred to as Service Control Points (SCPs) or adjuncts, which will be collectively referred to as SCPs. Switches such as End Offices and Access Tandems that support AIN capabilities are called Service Switching Points (SSPs). The AIN SSP is described in standards document GR-1298-CORE, "AINGR: Switching Systems," Issue 5, November 1999, Telcordia Technologies, which is hereby incorporated by reference.

SCPs typically include data bases in which customer-specific information is stored for use by the network to route or affect the processing of calls. An SCP receives a query message from the SSP when the SSP requires assistance in routing a call or providing a feature. The SCP responds to the SSP with routing or processing instructions for the call. In AIN, relatively inexpensive peripheral computers can provide flexible and efficient call processing, and local carriers can design and release new calling services by modifying the SCP data. SCPs can perform a wide variety of functions, ranging from providing simple instructions or data resources to managing the overall delivery of calling services.

FIG. 1 shows a block diagram of an example of an AIN network. End Offices EO 1-A and EO 1-B are connected to Access Tandems AT 2-A and AT 2-B over voice and signaling trunks 5-A and 5-B. AT 2-A and AT 2-B are connected over voice and signaling trunk 9. Switches 1-A, 1-B, 2-A and 2-B form a traditional telephone network. Signal Transfer Point STP 3-A is connected to switches 1-A and 2-A over Signaling System 7 (SS7) links 6-A and 7-A. Signal Transfer Point STP 3-B is connected to switches 1-B and 2-B over SS7 links 6-B and 7-B. STP 3-A and STP 3-B are connected over SS7 link 10. Signal Transfer Points are network elements that route messages in the AIN network. Service Control Points SCP 4-A and SCP 4-B are connected to STP 3-A and STP 3-B over SS7 signaling links 8-A and 8-B.

AIN is based on a basic call model that describes the essential processing steps done by an SSP in establishing a two-party call. FIG. 2 shows a portion of the AIN Originating Basic Call Model through sending a call setup indication to the Called Party ID. Each major call step is indicated by a box with a numbered step name inside, e.g., "1. O_NULL", "7. SEND_CALL", etc. Associated with the major call steps are trigger detection points, each indicated by a box with a "T". Each trigger detection point is further identified by a name, e.g., "(e1) Origination_Attempt". Trigger detection points identify when an SCP can receive notification of a given event and influence subsequent call processing. Each trigger detection point typically has several associated triggers that may be set. If a trigger is set at a certain trigger detection point, and the trigger is encountered during the processing of a call and no escape criteria are met, then the SSP will suspend normal call processing and send a query message to the SCP requesting call routing instructions. Upon receiving a response from the SCP, the SSP resumes call processing per the SCP instructions.

Early versions of AIN were directed to offloading a portion of the switch intelligence, but still required the switch to keep direct control of call management. An example is the 800 number service where the extensive translation database is offloaded to an SCP. The SSP requests number translation from the SCP and then completes the basic two-party call. Current AIN allows the SCP to control a call from off-hook through on-hook. The SCP may also delegate many tasks associated with call processing to intelligent peripherals, including voice prompting, digit collecting, and voice recognition.

Each AIN trigger is defined by many attributes that describe, for example, where in the call model the trigger is, under what criteria the trigger will be activated, the address of the SCP to which the SSP will send its request message, and fault handling such as timer expiration.

It is clear from the foregoing description that AIN is firmly rooted in a query/response model. In this model, mainline call processing is suspended when an SSP trigger is encountered. At this point, the SSP formulates a query, according to the trigger definition, and transmits it to the SCP. Further processing of the call remains suspended in the SSP until a response is received. Certain timers are also started in the SSP to ensure a timely return to the suspended call. The SCP then responds to the request with a message containing call processing instructions. The SSP then resumes call processing where it left off according to the call processing instructions received from the SCP.

There is one exception to the standard query/response trigger. This is the Origination_Attempt_Authorized trigger, in which an address internal to the SSP is used for the service logic address, or local SSP feature. In this trigger, no query message is sent to an external SCP. However, this trigger still follows the query/response model in that mainline call processing is suspended, processing continues at a sub-module of the SSP, and when this processing is completed, mainline call processing continues where it left off. Timers are still set, and fault processing will be invoked if mainline call processing does not resume within a certain time limit

SUMMARY OF THE INVENTION

The invention of Applicants is an addition to AIN that allows SSP triggers to jump to internal SSP addresses for service logic, or feature, processing without a return. The invention takes advantage of the existing AIN trigger mechanism and definitions, and adds the capability of a jump to an internal SSP address for continued call processing. There is no query sent to an SCP nor the associated response message, call processing is not suspended, and there is no need for fault handling associated with the trigger.

Applicants' invention will significantly improve feature execution time, reduce network traffic for specific high-use features that are moved from the SCP platform and coded directly in the SSP, and remove network or SCP contention and failures as a source of failure for the feature operation. While any feature that resides on an SCP could take advantage of Applicants' invention by being directly coded in the SSP, features that do not need a large database integration (such as the 800 number service described above) are particularly well suited. As a given feature is used by a significant percentage of the subscribers in a particular office, the cost factors may be such that direct SSP coding of the feature becomes an advantage. Direct SSP coding of the feature operation reduces the link occupancy otherwise used to communicate with the SCP, and SCP outages and periods of congestion will no longer prevent the subscribers from having use of the applicable features.

DESCRIPTION OF THE PREFERRED EMBODIMENT

Figure 1:
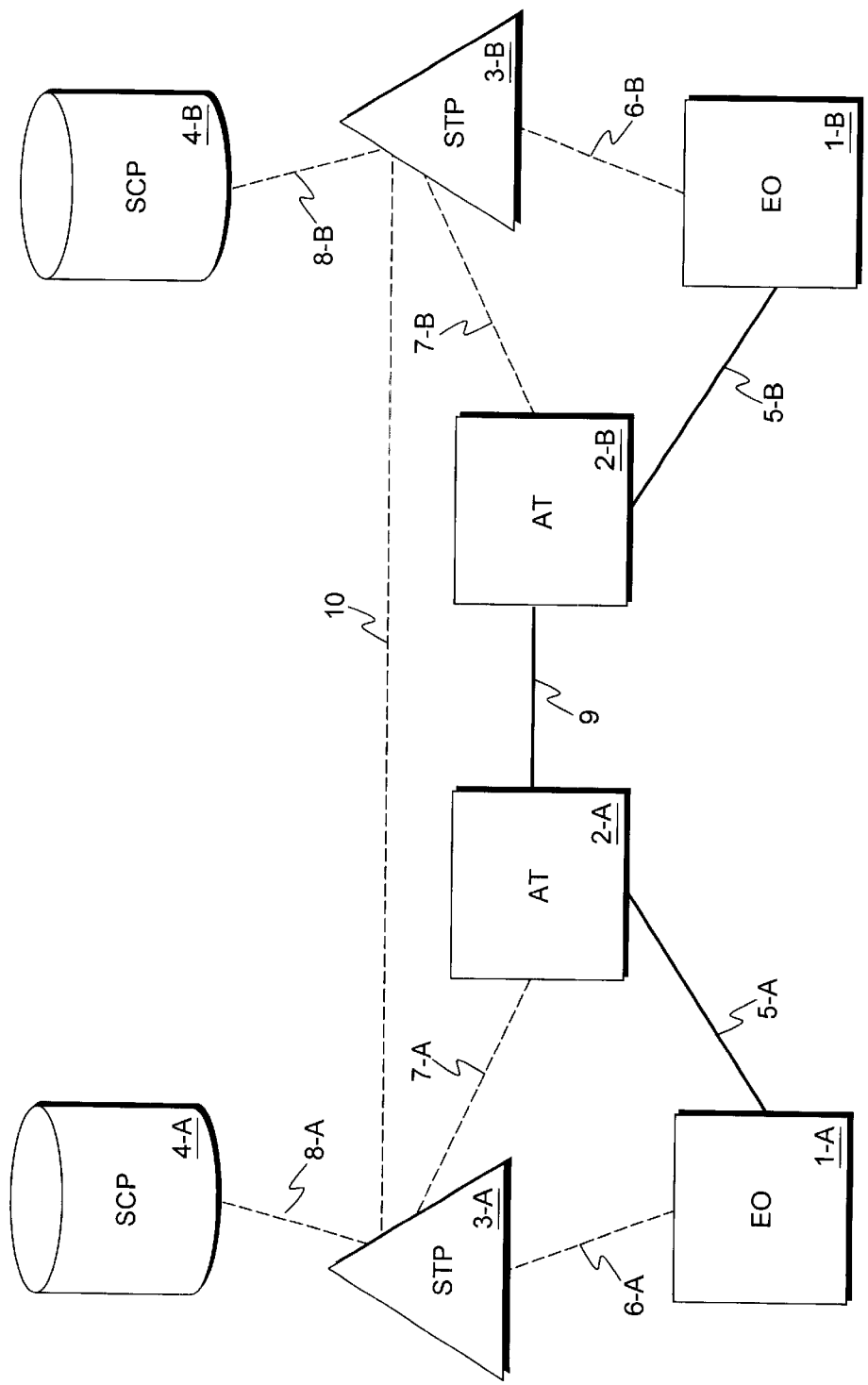
FIG. 1 shows a block diagram of an example of an AIN network.
Figure 2:
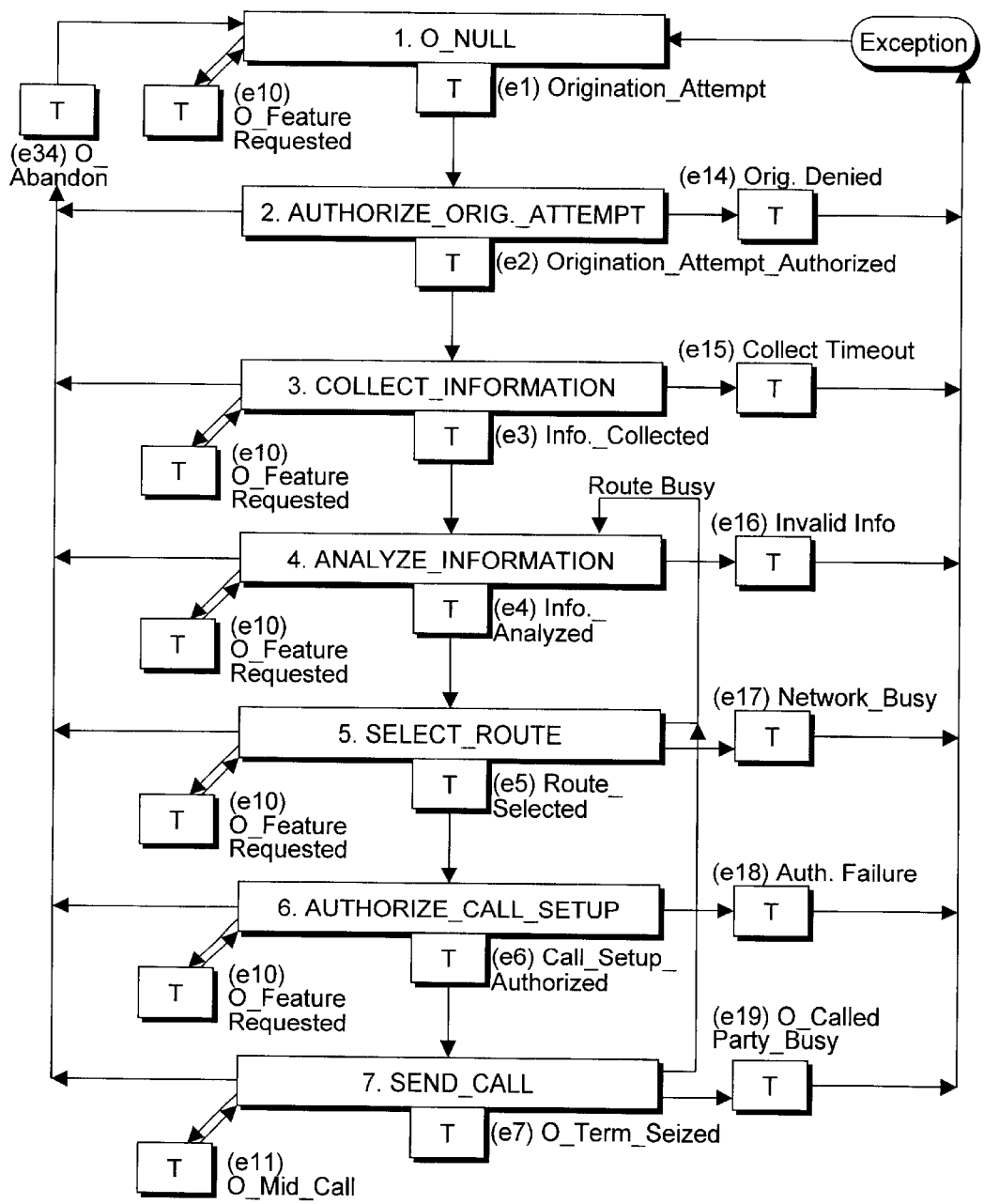
FIG. 2 shows a portion of the AIN Originating Basic Call Model through sending a call setup indication to the Called Party ID.

The invention of Applicants is a modification to the AIN SSP to extend the Service Logic Host Route addressing capability as it relates to local SSP features.

Trigger Item is an AIN entity that provides a correlation of trigger criteria with Service Logic Host Routes to facilitate the administration of triggers that are available to AIN users in an SSP. A Service Logic Host Route is an entity that is referenced by Trigger Item and provides routing and access control information for an application in a feature or service logic host. One of the subtype entities of Service Logic Host Route is Local SSP Application Route, which is used to point to an application in a local SSP.

Local SSP Feature is a supertype entity that provides for the provision of switched-based features in order to facilitate SSP administration to allow for triggering to a switched-based feature. One attribute of Local SSP Feature is Local__SSP__Feature__ID which provides an identifier by which the feature may be administered. Local__SSP__Feature__ID is also an attribute of Local SSP Application Route, by which the feature may be assigned to a specific Trigger Item.

In the preferred embodiment, Applicants' invention adds an attribute to the Local SSP Feature entity that identifies whether the trigger that invokes this local SSP feature is a traditional AIN trigger based on the AIN query/response model, or it is a trigger, in the manner of Applicants' invention, that transfers control to an internal local SSP feature address for continued call processing without a return.

This new attribute, referred to as Nature__of__SSP__Address__Code, is an elemental enumeration type attribute. Permissible values are 0 which indicates the local SSP feature is invoked by a traditional query/response type trigger, or 1 which indicates that the local SSP feature is invoked by a transfer of control type trigger.

In operation, when the trigger criteria for a trigger are satisfied, and no escape criteria are met, the trigger is invoked. If the trigger points to a local SSP feature, and the value of the Nature__of__SSP__Address__Code is 0, then the trigger is handled in accordance with AIN protocol. This includes call suspension during trigger processing, and AIN fault handling. It should be noted that the current AIN limits the use of a local SSP feature in a trigger that is handled within the traditional AIN call model to the Origination__Attempt__Authorized trigger.

If the trigger points to a local SSP feature, and the value of the Nature__of__SSP__Address__Code is 1, then the trigger transfers control of call processing to the internal SSP feature address identified by Local SSP Application Route. In this case, the trigger is handled in a non-traditional manner in that call processing is not suspended, but instead is transferred to an internal SSP address for an uninterrupted continuation of call processing. There are no messages exchanged with an external SCP. However, message parameters that would normally be available for trigger related SSP-to-SCP messages will be available to the internal SSP feature. There is no AIN fault handling. Applicants' invention may be applied to any of the AIN trigger detection points in the AIN call model.

Since the implementation of AIN on an SSP is manufacturer and switch dependent, specific implementation details will not be given. However, a person having ordinary skill in the art of Applicants' invention with a working knowledge of the specific AIN implementation details for a given manufacturer and switch will readily be able to implement Applicants' invention on that manufacturer's switches or specific switch.

The modifications required for Applicants' invention are limited to the switch and no modifications are needed at the AIN SCP. Also since the modifications are to provide a feature operation internally to the SSP, no coordination is necessary between SSPs. Thus, installing the required modifications in one SSP does not require the modifications to be made to other SSPs not offering such features to their associated subscribers.

The preferred embodiment of Applicants' invention is a feature that will play an advertisement when a certain block of directory numbers (DNs), for example, a block of a thousand numbers associated with a company's phone system, is dialed. This is a good candidate feature for treatment by Applicants' invention because there is not a large database associated with the feature. This feature is coded into the SSP software. In this embodiment, full advantage is taken of the AIN trigger definitions, and triggers associated with the (e3) Info__Collected point in call are defined such that a trigger is invoked when one of the desired block of numbers is dialed. The triggers are defined with an internal SSP feature address, and attribute Nature__of__SSP__Address__Code set to 1, indicating a transfer of control without return type trigger. When one of the triggers is invoked, call control is transferred to the internal SSP feature, where the caller is connected to, for example, a message platform that plays an advertisement. When the advertisement has played, SSP call processing continues and the caller is connected to the called party. Fault handling for this feature is handled by the feature itself.

While the inventive system has been particularly shown and described, it is not intended to be exhaustive nor to limit the invention to the embodiment disclosed. It will be apparent to those skilled in the art that modifications can be made to the present invention without departing from the scope and spirit thereof. For example, Applicants' invention uses a newly defined attribute for the Local SSP Feature entity to indicate that the trigger is a transfer of control type trigger. This attribute could be included in any suitable trigger related entity. It is intended that the scope of the invention be defined by the claims appended hereto and their equivalents.

What is claimed is:

1. An advanced intelligent network (AIN) service switching point (SSP), comprising:

service logic in the SSP having a service logic address;

an AIN trigger service logic host route address indicator operated to indicate that a trigger is processed such that call processing control is transferred to a service logic address in the SSP for uninterrupted continuation of call processing without a return to the trigger processing logic;

an AIN trigger having a service logic host route address of said service logic address, and having said service logic host route address indicator; and AIN trigger processing logic operated to process said AIN trigger and to transfer call processing control to said service logic address in the SSP for uninterrupted continuation of call processing without a return to the trigger processing logic, if said service logic host route address indicator so indicates.

2. An advanced intelligent network (AIN) service switching point (SSP) according to claim 1, wherein said service logic host route address indicator is an attribute of the AIN Local SSP Feature entity.

3. An advanced intelligent network (AIN) service switching point (SSP) operated to process AIN triggers, the improvement comprising:

service logic directly coded in the SSP and having a service logic address;

an AIN trigger service logic host route address indicator operated to indicate that a trigger is processed such that call processing control is transferred to a service logic address in the SSP for uninterrupted continuation of call processing without a return to the trigger processing logic;

an AIN trigger having a service logic host route address of said service logic address, and having said service logic host route address indicator; and AIN trigger processing logic operated to process said AIN trigger and to transfer call processing control to said service logic address in the SSP for uninterrupted continuation of call processing without a return to the trigger processing logic, if said service logic host route address indicator so indicates.

4. An advanced intelligent network (AIN) service switching point (SSP) according to claim 3, wherein said service logic host route address indicator is an attribute of the AIN Local SSP Feature entity.

5. A method to process an advanced intelligent network (AIN) trigger on a service switching point (SSP), said AIN including a service logic host route address indicator, the method comprising:

directly coding a service logic in the SSP, said service logic having a service logic address;

defining an AIN trigger having a service logic host route address of said service logic address, and having said service logic host route address indicator;

processing said AIN trigger and transferring call processing control to said service logic address in the SSP for uninterrupted continuation of call processing without a return to the trigger processing logic, if the service logic host route address indicator so indicates.

6. A method according to claim 5, wherein said service logic host route address indicator is an attribute of the AIN Local SSP Feature entity.

* * * * *